United States Patent
Correia et al.

[11] Patent Number: 6,164,914
[45] Date of Patent: Dec. 26, 2000

[54] COOL TIP BLADE

[75] Inventors: Victor H. S. Correia, Milton Mills, N.H.; Robert F. Manning, Newburyport, Mass.

[73] Assignee: General Electric Company, Cincinnati, Ohio

[21] Appl. No.: 09/379,023

[22] Filed: Aug. 23, 1999

[51] Int. Cl.[7] .................................. F01D 5/18; F01D 5/20
[52] U.S. Cl. ..................... 416/97 R; 416/92; 415/115; 415/173.1; 415/173.4
[58] Field of Search ................. 416/97 R, 96 A, 416/96 R, 97 A, 92; 415/115, 173.1, 173.4

[56] References Cited

U.S. PATENT DOCUMENTS

| | | | |
|---|---|---|---|
| 4,142,824 | 3/1979 | Anderson | 416/97 R |
| 4,753,575 | 6/1988 | Levengood et al. | 416/97 R |
| 5,261,789 | 11/1993 | Butts et al. | 416/96 R |
| 5,564,902 | 10/1996 | Tomita | 416/97 R |
| 5,902,093 | 5/1999 | Liotta et al. | 416/97 R |

Primary Examiner—Edward K. Look
Assistant Examiner—Richard Woo
Attorney, Agent, or Firm—Andrew C. Hess; Rodney M. Young

[57] ABSTRACT

A turbine blade includes a hollow airfoil having a squealer tip rib extending outboard from a tip cap enclosing the airfoil. An impingement baffle is spaced inboard from the tip cap to define a tip plenum therebetween. Impingement holes extend through the baffle and are directed at the junction of the rib and cap for impinging a coolant jet thereagainst.

20 Claims, 3 Drawing Sheets

COOL TIP BLADE

The U.S. Government may have certain rights in this invention in accordance with Contract No. N00421-97-C-1232 awarded by the Dept. of the Navy.

BACKGROUND OF THE INVENTION

The present invention relates generally to gas turbine engines, and, more specifically, to turbine blade cooling.

In a gas turbine engine, air is pressurized in a compressor and mixed with fuel and ignited in a combustor for generating hot combustion gases. The gases flow through turbine stages which extract energy therefrom for powering the compressor and producing useful work, such as powering a fan for propelling an aircraft in flight.

A turbine stage includes a row of turbine blades extending radially outwardly from a supporting rotor disk. Each blade includes an airfoil over which the combustion gases flow for extracting energy therefrom. The airfoil is hollow and is provided with air bled from the compressor for use as a coolant in cooling the blade during operation.

Maximum efficiency of the turbine is obtained by closely positioning the radially outer tip of the airfoil adjacent a surrounding stationary turbine shroud for minimizing combustion gas leakage therebetween. However, differential thermal expansion and contraction between the blade tips and turbine shroud can cause rubbing therebetween. To accommodate this rubbing, the tip of the airfoil includes a squealer tip rib around its perimeter extending outwardly from a tip cap enclosing a coolant flow channel inside the airfoil. The squealer rib may be closely positioned adjacent the shroud and limits rubbing therebetween to the surface area of the rib itself.

The squealer rib is thusly exposed on three sides to the hot combustion gases and is difficult to cool, and correspondingly affects useful blade life. The airfoil tip is typically cooled by providing tip holes through the tip cap which discharge a portion of the coolant into the tip cavity defined above the tip cap. And, inclined film cooling holes may extend through the concave or pressure sidewall of the airfoil just below the tip cap to provide film cooling air which bathes the pressure side portion of the tip with film cooling air.

However, cooling of the squealer rib is limited in effectiveness, and thermal gradients and s tress therefrom are created which also affect blade life. The exposed squealer rib runs hotter than the airfoil sidewalls, with the tip cap therebetween running cooler. Tip cooling must therefore be balanced against undesirable thermal gradients.

Accordingly, it is desired to provide a turbine blade having improved airfoil tip cooling.

BRIEF SUMMARY OF THE INVENTION

A turbine blade includes a hollow airfoil having a squealer tip rib extending outboard from a tip cap enclosing the airfoil. An impingement baffle is spaced inboard from the tip cap to define a tip plenum therebetween. Impingement holes extend through the baffle and are directed at the junction of the rib and cap for impinging a coolant jet thereagainst.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
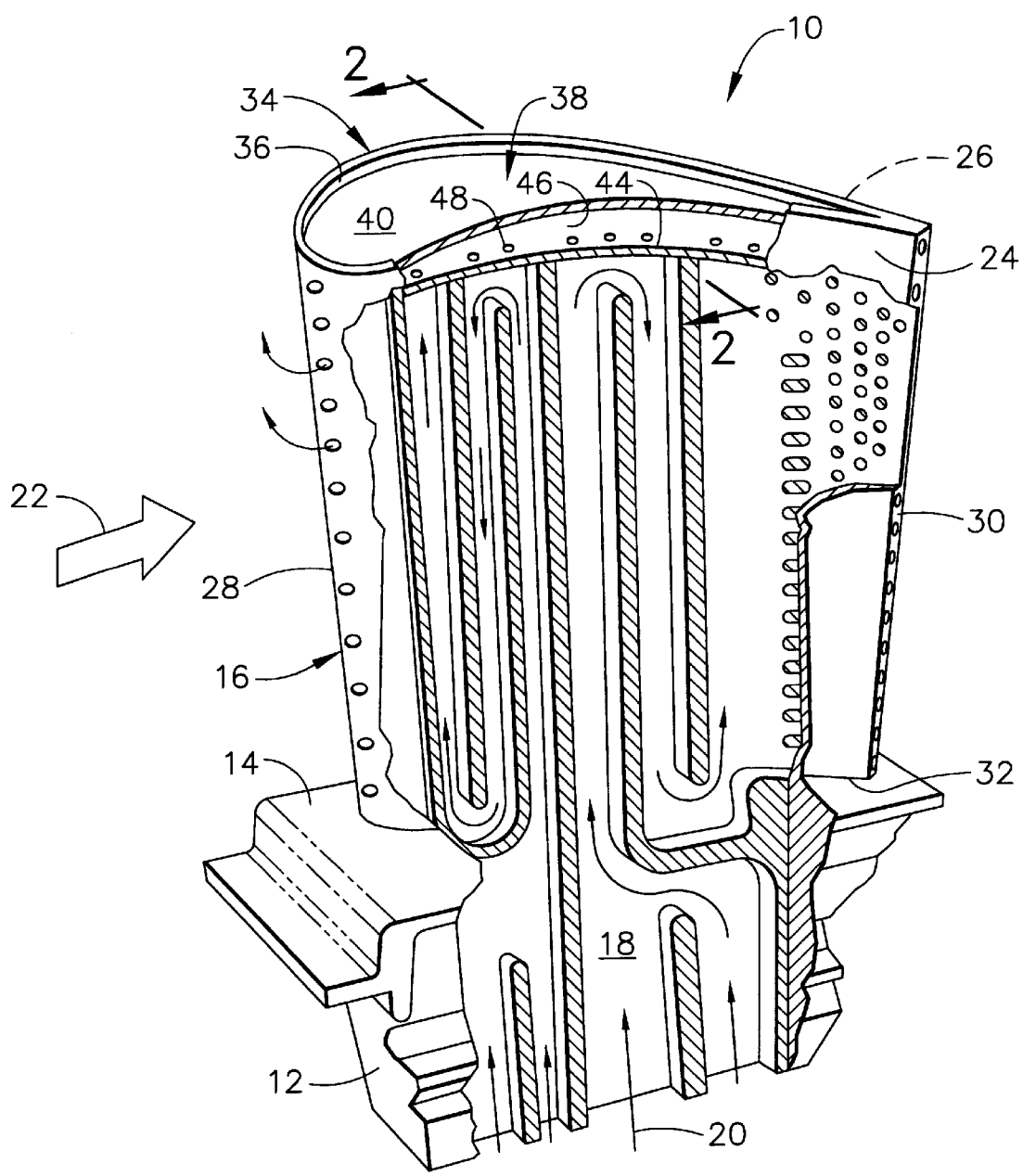
FIG. 1 is a partly sectional, isometric view of an exemplary gas turbine engine turbine rotor blade having an improved tip in accordance with an exemplary embodiment of the present invention.

Illustrated in FIG. 1 is an exemplary turbine rotor blade 10 for a gas turbine engine. The blade is one of many circumferentially spaced apart around the perimeter of a turbine rotor disk (not shown). Each blade includes a suitable dovetail 12 which retains the blade in a complementary dovetail slot formed in the perimeter of the disk. The blade has a radial or longitudinal axis, with an integral platform 14 and hollow airfoil 16 disposed in turn radially above the dovetail.

The blade is typically cast in a unitary or one-piece component, and includes an internal flow channel or circuit 18 for channeling a coolant 20 therethrough. The flow channel 18 may have any conventional form, such as multipass serpentine channels, with the coolant 20 typically being a portion of air bled from the compressor of the engine.

During operation, air pressurized in the compressor is mixed with fuel and ignited in a combustor (not shown) for generating hot combustion gases 22 that flow over the airfoil 16 which extracts energy therefrom for rotating the rotor disk. The airfoil 16 includes a generally concave, first or pressure sidewall 24 spaced laterally or circumferentially in most part from a convex, second or suction sidewall 26. The sidewalls are joined together at axially opposite leading and trailing edges 28,30, and extend longitudinally or radially from a root 32 where the airfoil meets the platform to a radially outer tip 34.

The blade or airfoil tip includes a squealer tip rib 36 which is integrally disposed along the pressure and suction sidewalls 24,26 to define an open tip cavity 38 extending radially outwardly or outboard from a tip floor or cap 40 enclosing the airfoil. In the exemplary embodiment illustrated in FIG. 2, the tip rib 36 extends from the perimeter of the tip cap 40 and is coextensive with the pressure and suction sidewalls 24,26 around the perimeter of the airfoil.

In accordance with the present invention, means are provided for internally impingement cooling the tip rib 36 at its base or junction 42 with the tip cap. In the exemplary embodiment illustrated in FIG. 2, the impingement cooling means include an impingement baffle or bridge 44 spaced radially inwardly or inboard from the tip cap 40 to define a tip plenum 46 therebetween.

A plurality of impingement holes 48 extend through the baffle and are aimed or directed at the inboard side of the tip cap at the junction with the tip rib for impinging a jet of the coolant air 20 thereagainst.

As shown in FIG. 1, the impingement baffle 44 may be spaced inboard from the tip cap 40 between the leading and trailing edges of the airfoil. The cooling circuit 18 is disposed inboard of the baffle 44 and may have any conventional configuration, such as the two serpentine cooling circuits illustrated. The impingement holes 48 extend through the baffle in flow communication with respective portions of the cooling circuit 18 for receiving respective portions of the coolant therefrom. The impingement holes are sized to develop a corresponding pressure drop thereacross for discharging the coolant in impingement jets at the base of the tip rib.

In this way, the increased heat transfer attributable to impingement cooling may be used to advantage for internally impingement cooling the tip rib at its base to counter the heating of the three exposed sides of the rib.

Figure 2:
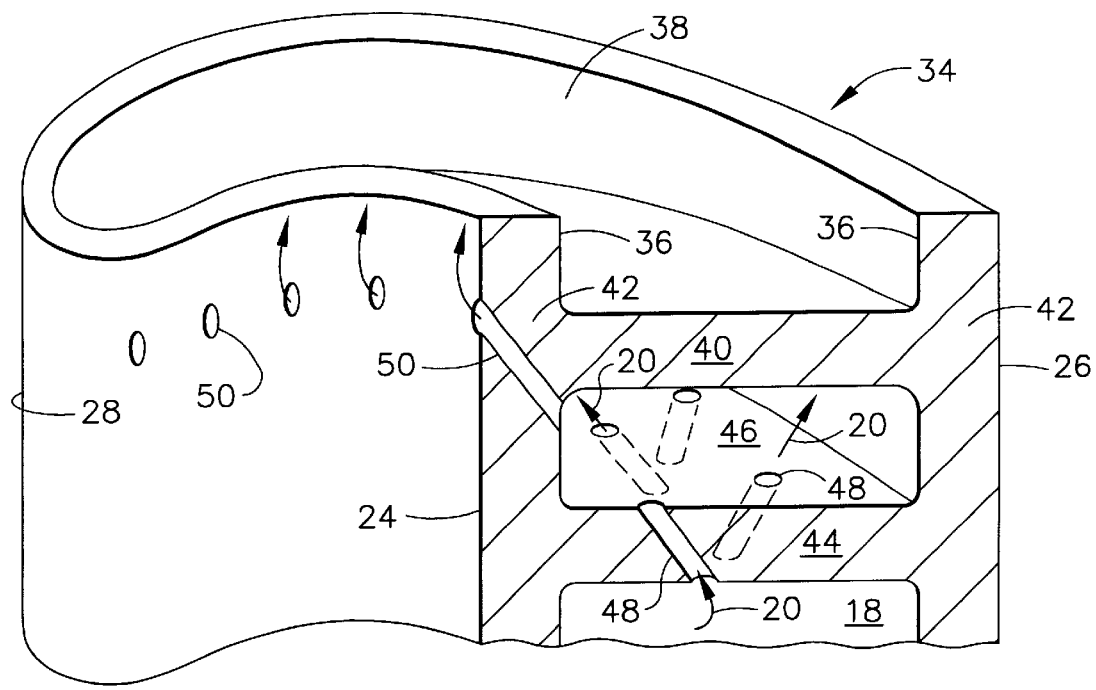
FIG. 2 is a partly sectional, elevational view of the tip portion of the airfoil illustrated in FIG. 1 and taken generally along line 2—2.

In the exemplary embodiment illustrated in FIG. 2, the tip rib 36 extends around the perimeter of the airfoil and is coextensive with its sidewalls. Accordingly, the junction 42 of the tip rib and tip cap is disposed atop respective portions of the sidewalls. In order to impingement cool the tip rib from inside the airfoil, the impingement holes 48 are directed at the internal corners of the tip cap and sidewalls at which portions of the junctions 42 are exposed.

Since the sidewalls of the airfoil and the tip rib are directly exposed to the hot combustion gases during operation, they run significantly hotter than the tip cap 40 which is internally cooled by convection from the coolant 20 channeled through the plenum 46. The impingement holes 48 are preferably directed at the base of the tip rib instead of at the tip cap 40 itself between the opposing portions of the tip rib on opposite sidewalls of the airfoil to prevent excessive cooling of the tip cap.

It is desirable to reduce thermal gradients in the airfoil during operation to correspondingly reduce thermal stress therefrom. By directing the impingement holes 48 at the base of the tip rib instead of the central portion of the tip cap, the tip rib is selectively cooled without overcooling the tip cap for thereby reducing differential temperatures during operation.

In the preferred embodiment illustrated in FIG. 2, the tip cap 40 is imperforate between the opposing portions of the tip rib on opposite sidewalls of the airfoil. In this way, the tip cap is cooled solely from inside to prevent overcooling thereof. The impingement holes 48 are arranged in two rows inclined through the baffle 44 to direct their impingement jets at the corresponding junctions 42 below the pressure and suction side portions of the tip rib. The junctions 42 are preferably flared or arcuate at the respective corners between the tip cap and sidewalls for increasing the available surface area against which the impingement jets may impinge and withdraw heat.

In the exemplary embodiment illustrated in FIG. 2, a plurality of conventional film cooling holes 50 extend through the junction 42 of the tip cap 40 below the pressure-side portion of the tip rib for discharging the coolant from the tip plenum 46 in a layer of film cooling air for flow along the exposed pressure side of the tip rib 36. In this way, the pressure-side portion of the tip rib 36 is protected by film cooling air, and the rib is internally cooled by the impingement jets. The two rows of impingement holes 48 directed at the tip rib portions on opposite sidewalls may be staggered from each other along the chord of the airfoil, and may also be staggered with the row of film cooling holes 50.

Figure 3:
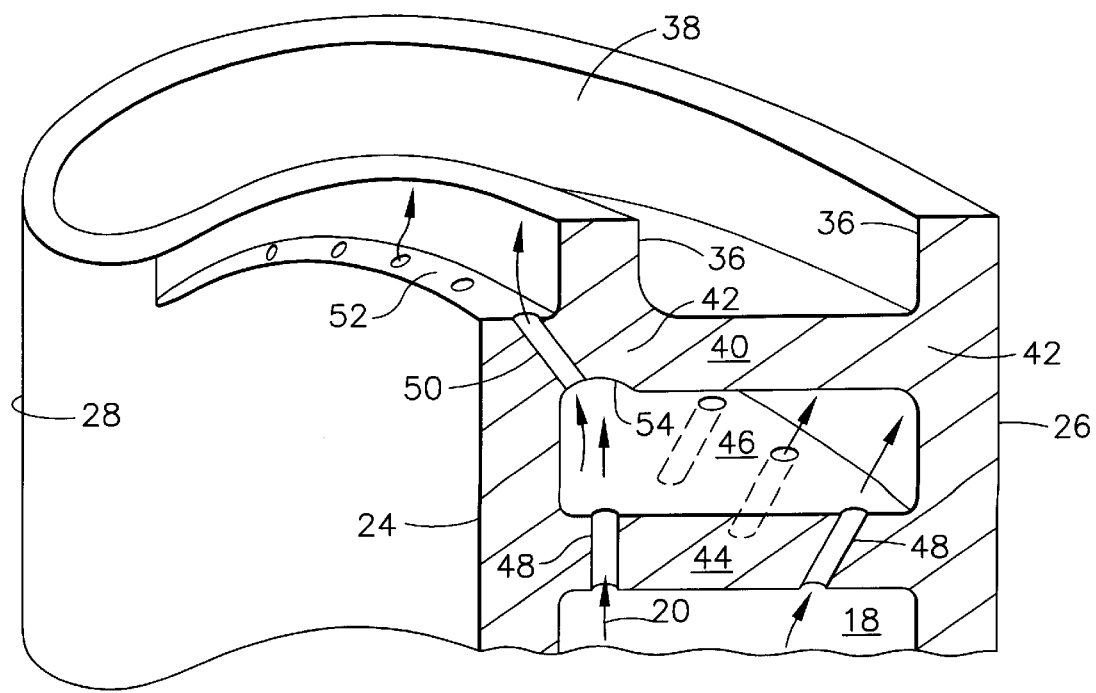
FIG. 3 is an elevational, partly sectional view, like FIG. 2, showing the airfoil tip in accordance with another embodiment of the present invention.

Illustrated in FIG. 3 is an alternate embodiment of the impingement cooled airfoil tip. In this embodiment, the tip rib 36 is laterally recessed or offset at least in part from one of the sidewalls atop the tip cap to position the junction 42 thereof directly atop the tip plenum 46 for direct impingement cooling thereof. In FIG. 3, the pressure-side portion of the tip rib 36 is offset from the pressure sidewall 24 to define a tip shelf 52 atop the pressure sidewall.

Figure 4:
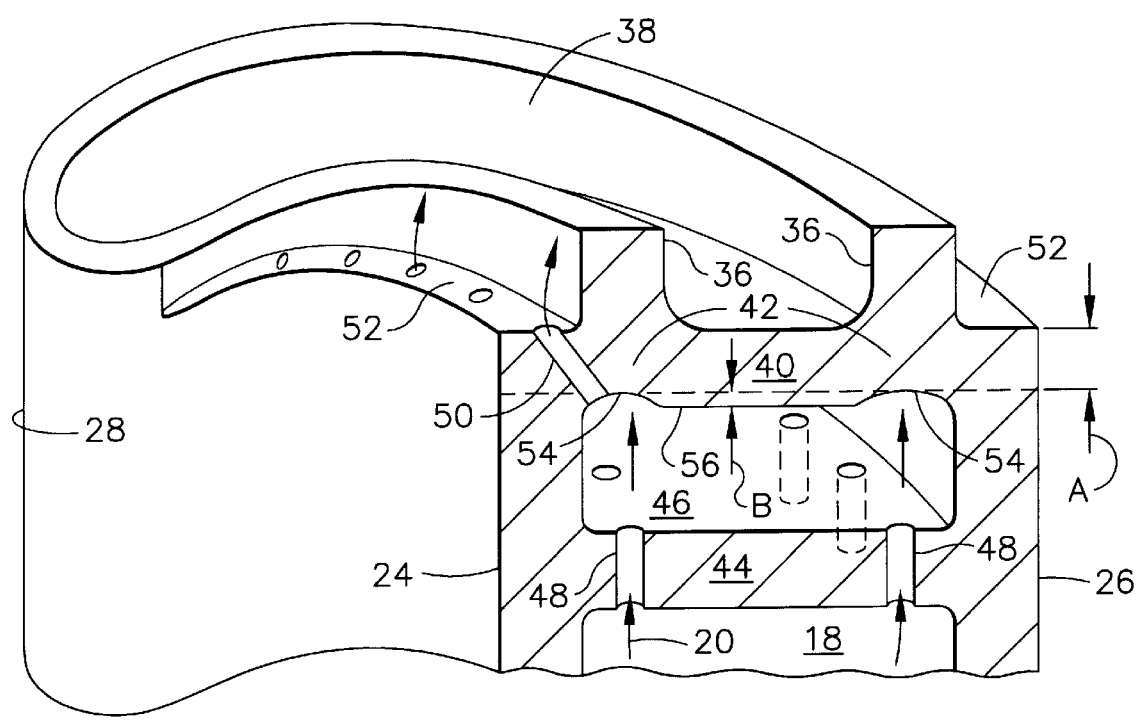
FIG. 4 is an elevational, partly sectional view, like FIG. 2, showing the airfoil tip in accordance with another embodiment of the present invention.

FIG. 4 illustrates yet another embodiment of the impingement cooled airfoil tip wherein the suction-side portion of the tip rib 36 is also laterally recessed from the airfoil suction sidewall 26 to define a corresponding tip shelf 52 thereatop. In this way, laterally opposite portions of the tip rib extending along the pressure and suction sidewalls 24,26 are offset therefrom atop the tip cap 40 to position the respective junctions 42 of the tip rib atop the tip plenum for direct impingement cooling thereof.

In both embodiments illustrated in FIGS. 3 and 4, the pressure-side tip rib 36 is positioned directly atop the tip plenum 46 and decoupled from the pressure sidewall 24. The film cooling holes 50 preferably extend through the tip shelf to discharge the film cooling air along the pressure side of the tip rib.

The pressure-side tip rib 36 is thusly protected from the hot combustion gases by the offset tip shelf 52 and the film cooling air discharged therefrom. The film cooling holes 50 are preferably inclined through the tip shelf which provides internal cooling for additionally thermally isolating the base of the tip rib from the pressure sidewall.

And, the impingement holes 48 below the pressure-side tip rib may be directed radially outwardly to directly impinge the junction 42 of the tip rib and cap now fully exposed atop the plenum.

In FIG. 3, the suction-side portion of the tip rib 36 is not offset from the airfoil suction side, and the impingement holes 48 remain inclined through the baffle for impinging the exposed corner portion of the junction 42. In FIG. 4, the suction-side portion of the tip rib is also laterally offset from the airfoil suction sidewall, with the impingement holes 48 therebelow extending radially outwardly through the baffle 44 for impinging the now fully exposed junction 42 thereof.

Since the base or junction 42 of the tip rib 36 is fully exposed in the embodiments illustrated in FIGS. 3 and 4, the tip cap 40 preferably includes a recess or trough 54 facing inboard toward the plenum 46, and coaxially aligned with the tip rib 36 itself for increasing the surface area in the junction for receiving the impingement cooling jet thereagainst. The impingement holes 48 are preferably aligned perpendicularly to the trough 54 and coaxially in the radial direction, with the tip rib 36 extending outboard therefrom. In this way, the tip rib is now fully impingement cooled from its base atop the tip cap 40 for increasing the cooling effectiveness thereof.

Furthermore, the tip rib 36 preferably flares at a suitably large radius at the junction 42 at the outboard side of the tip cap 40 for increasing conduction area between the trough 54 and the tip rib.

The trough 54 and rib flaring provide several advantages to more effectively cooling the tip rib. As indicated above, the trough 54 increases the surface area being impingement cooled by the coolant jets from the impingement holes 48. The trough 54 also reduces the local thickness of the tip cap at its junction with the tip rib which improves the heat conduction therebetween and corresponding cooling at the trough. The flared corner of the tip rib 36 offsets the trough 54 from maintaining a relatively large cross sectional area therebetween for removing heat by conduction through the tip cap 40 into the coolant within the plenum 46. Heat is thusly more effectively conducted away from the exposed tip rib 36 and through the tip cap into the coolant channeled within the tip plenum 46.

In the FIG. 4 embodiment, the opposite portions of the tip rib disposed along the airfoil pressure and suction sides are both offset to define corresponding tip shelves 52. Correspondingly, the pressure and suction side tip rib portions are disposed directly atop the tip plenum 46 for internal impingement, while reducing the exposed area of the tip cap 40 and the exposed volume of the tip cavity 38 between the tip ribs. The tip rib 36 is therefore directly impingement cooled from below the tip cap along both airfoil sidewalls without overcooling the middle of the tip cap below the tip cavity 38. If desired, the tip cap 40 may include discharge holes therethrough (not shown) for discharging a portion of the coolant into the tip cavity 38 for reducing or preventing recirculation of the hot combustion gases therein.

In the FIG. 4 embodiment, the tip cap 40 has a nominal thickness A between the sidewalls and the tip shelves 52, and is preferably locally thicker by introducing a land 56 of thickness B laterally between the two troughs 54 and below the tip cavity 38. The troughs 54 are therefore defined in part by the increased thickness attributable to the land 56. The increased thickness of the tip cap below the tip cavity increases thermal mass and correspondingly increases the operating temperature of the tip cap thereat.

In this way, the tip rib 36 directly exposed to the hot combustion gases is more effectively impingement cooled from the inside the airfoil for reducing temperature gradients, and the tip cap 40 below the tip cavity 38 may be operated warmer than it otherwise would for further decreasing the differential temperatures in the airfoil tip. The tip rib is thusly selectively or locally cooled with enhanced impingement cooling, while the tip cap between the opposing portions of the tip rib may be run warmer than it otherwise would.

The various embodiments of the improved impingement cooled airfoil tip disclosed above may be formed as unitary or one-piece casting in any conventional manner. Typically this involves the use of ceramic cores defining the configurations of the internal flow circuit 18, tip plenum 46, and tip cavity 38, with the cores being suitably held together during the casting process. For example, ties or pins may be located to define the impingement holes 48 through the baffle 44. Additional ties or pins may be located through the tip cap 40 to form resulting holes therein, which may be suitably filled, by brazing for example.

The various portions of the tip rib 36 following the perimeter of the airfoil may be more effectively impingement cooled in accordance with the present invention for reducing thermal gradients thereat without increasing thermal gradients in the tip cap below the tip cavity itself. The tip rib is selectively cooled to advantage for reducing the thermal gradients experienced by the airfoil tip during operation, which in turn reduces thermal stress therefrom, and prolongs blade life.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
    a hollow airfoil having a squealer tip rib extending outboard from a tip cap enclosing said airfoil; and
    means for internally impingement cooling said tip rib at a junction with said tip cap.

2. A blade according to claim 1 wherein said cooling means comprising:
    an impingement baffle space inboard from said tip cap to define a tip plenum therebetween; and
    a plurality of impingement holes extending through said baffle and directed at said junction for impinging a coolant jet thereagainst.

3. A blade according to claim 2 wherein:
    said airfoil includes pressure and suction sidewalls joined together at leading and trailing edges, and extending from a root to tip; and
    said tip rib is offset at least in part from one of said sidewalls atop said tip cap to position said junction atop said tip plenum for impingement cooling thereof.

4. A blade according to claim 3 wherein said tip cap includes a trough facing said plenum and aligned with said tip rib for increasing surface area to receive said coolant jet thereagainst.

5. A blade according to claim 4 wherein:
    said tip rib includes opposing portions at said pressure and suction sidewalls; and
    said tip cap is locally thicker between said opposing portions of said tip rib for increasing thermal mass thereof.

6. A blade according to claim 4 wherein said tip rib flares at said junction with said tip cap for increasing conduction area between said trough and said tip rib.

7. A blade according to claim 4 wherein said tip rib includes opposite portions at said pressure and suction sidewalls offset therefrom atop said tip cap to position respective junctions thereof atop said tip plenum for impingement cooling thereof.

8. A turbine blade comprising:
    a hollow airfoil including pressure and suction sidewalls joined together at leading and trailing edges and extending from a root to tip;
    said tip including a squealer tip rib extending outboard from a junction with a tip cap enclosing said sidewalls to define a tip cavity thereatop;
    an impingement baffle spaced inboard from said tip cap and joined to said sidewalls to define a tip plenum therebetween; and
    a plurality of impingement holes extending through said baffle and directed at said junction for impinging a coolant jet thereagainst.

9. A blade according to claim 8 wherein said tip rib is offset at least in part from one of said sidewalls atop said tip cap to position said junction atop said tip plenum for impingement cooling thereof.

10. A blade according to claim 9 wherein said tip cap includes a trough facing said plenum and aligned with said tip rib for increasing surface area to receive said impingement jet thereagainst.

11. A blade according to claim 10 wherein:
    said tip rib includes opposing portions at said pressure and suction sidewalls; and
    said tip cap is locally thicker between said opposing portions of said tip rib for increasing thermal mass thereof.

12. A blade according to claim 11 wherein said tip rib flares at said junction with said tip cap for increasing conduction area between said trough and said tip rib.

13. A blade according to claim 12 wherein said opposing portions of said tip rib are offset from said pressure and suction sidewalls atop said tip cap to position respective junctions thereof atop said tip plenum for impingement cooling thereof.

14. A turbine blade comprising:
- a hollow airfoil including pressure and suction sidewalls joined together at leading and trailing edges, and extending from a root to tip;
- said tip including a squealer tip rib extending outboard from a junction with a tip cap enclosing said sidewalls to define a tip cavity thereatop;
- an impingement baffle spaced inboard from said tip cap and joined to said sidewalls to define a tip plenum therebetween;
- a plurality of impingement holes extending through said baffle and directed at said junction for impinging a coolant jet thereagainst; and
- said tip rib is offset at least in part from one of said sidewalls atop said tip cap to position said junction atop said tip plenum for impingement cooling thereof.

15. A blade according to claim 14 wherein said tip cap includes a trough facing said plenum and aligned with said tip rib for increasing surface area to receive said impingement jet thereagainst.

16. A blade according to claim 15 wherein said tip rib flares at said junction with said tip cap for increasing conduction area between said trough and said tip rib.

17. A blade according to claim 16 wherein said tip rib includes opposing portions offset from said pressure and suction sidewalls atop said tip cap to position respective junctions thereof atop said tip plenum for impingement cooling thereof.

18. A blade according to claim 17 wherein said tip cap is locally thicker between said opposing portions of said tip rib for increasing thermal mass thereof.

19. A blade according to claim 17 wherein said tip cap is imperforate between said opposing portions of said tip rib.

20. A blade according to claim 16 wherein:
- said offset tip rib defines a tip shelf atop a corresponding one of said sidewalls; and
- said tip shelf includes a plurality of film cooling holes extending therethrough to said tip plenum for receiving coolant therefrom.

* * * * *